United States Patent [19]

Sasagawa

[11] Patent Number: 4,869,907

[45] Date of Patent: Sep. 26, 1989

[54] METHOD OF ENHANCING GROWTH AND WEIGHT GAIN IN SWINE AND BLOCK FOR USE THEREIN

[75] Inventor: Tutomu Sasagawa, Shizuoka, Japan

[73] Assignee: Toyo Jozo Kabushiki Kaisha, Shizuoka, Japan

[21] Appl. No.: 22,203

[22] Filed: Mar. 5, 1987

Related U.S. Application Data

[63] Continuation-in-part of Ser. No. 725,134, Apr. 18, 1985, abandoned.

[30] Foreign Application Priority Data

Apr. 18, 1984 [JP] Japan ................. 59-76446

[51] Int. Cl.$^4$ .................. A61K 9/00; A61K 31/70
[52] U.S. Cl. ........................ 424/442; 514/23; 426/658
[58] Field of Search ............ 514/23; 424/442, 438; 426/658; D1/100

[56] References Cited

U.S. PATENT DOCUMENTS

| | | | |
|---|---|---|---|
| D. 129,820 | 10/1941 | Gearing | D1/100 |
| D. 195,545 | 7/1963 | Aniser | D1/100 |
| 1,575,975 | 3/1926 | Daly | 127/30 |
| 2,046,833 | 7/1936 | Meyer | 514/777 |
| 2,139,910 | 12/1938 | Patten | D1/100 |
| 2,807,559 | 9/1957 | Steiner | 426/454 |
| 2,926,085 | 2/1960 | Geerlings | 514/770 |
| 3,241,974 | 3/1966 | Seiden | 426/2 |
| 3,246,336 | 4/1966 | Baribo et al. | 426/2 |
| 3,305,447 | 2/1967 | Reimers et al. | 127/30 |
| 3,868,467 | 2/1975 | Olson | 426/72 |
| 3,929,503 | 12/1975 | Yamauchi | 127/58 |
| 4,024,250 | 5/1977 | Palm | 536/1.1 |
| 4,059,460 | 11/1977 | Schollmeier et al. | 127/29 |
| 4,061,728 | 12/1977 | Graham et al. | 514/54 |
| 4,125,629 | 11/1978 | Rossi | 426/2 |
| 4,162,336 | 7/1979 | Brown, Jr. et al. | 426/623 |
| 4,171,379 | 10/1979 | Harmon et al. | 426/2 |
| 4,171,386 | 10/1979 | Skoch et al. | 426/658 |
| 4,212,896 | 7/1980 | Brown, Jr. et al. | 426/623 |
| 4,221,818 | 9/1980 | Schroeder | 426/138 |
| 4,294,856 | 10/1981 | Kinumaki et al. | 426/7 |
| 4,362,710 | 12/1982 | Watanabe | 424/442 |
| 4,451,488 | 5/1984 | Cook et al. | 426/89 |
| 4,496,606 | 1/1985 | Michnowski | 426/658 |

FOREIGN PATENT DOCUMENTS

| | | | |
|---|---|---|---|
| 2467599 | 5/1981 | France | 514/23 |
| 57-202254 | 12/1982 | Japan | 424/180 |
| 0575098 | 10/1977 | U.S.S.R. | 514/23 |

*Primary Examiner*—Ronald W. Griffin
*Assistant Examiner*—Nancy S. Carson
*Attorney, Agent, or Firm*—Young & Thompson

[57] ABSTRACT

A method for reducing stress in animals, such as pigs in an overcrowded breeder, by exposing a block to be licked by the animals. The block contains at least 50% by weight and preferably at least 70% by weight glucose, has a compressive strength over 5 kg/cm$^2$ preferably 50–150 kg/cm$^2$, and a water content of 0.1–20% by weight. The block is too large to be swallowed by the animals and its compressive strength prevents crumbling. It is at least 50 g in weight, e.g. 500 g, and each dimension is more than 2 cm. The block is preferably secured above ground level and is slowly consumed by the animals by licking or pecking.

2 Claims, No Drawings

METHOD OF ENHANCING GROWTH AND WEIGHT GAIN IN SWINE AND BLOCK FOR USE THEREIN

CROSS-REFERENCE TO RELATED APPLICATIONS

This application is a continuation-in-part application of application Ser. No. 725,134, filed Apr. 18, 1985, now abandoned.

BACKGROUND OF THE INVENTION

This invention relates to a method for reducing stress in animals, and a block for use in practicing the method. The invention is particularly useful for the reduction of tail biting and ear biting among pigs caused by stress in an overcrowded breeder during the fattening stage and the weaning period. The invention is further useful for reducing the incidence of cannibalism among poultry, and improving the feed conversion ratio and weight gain of cattle and swine.

Growth promotion of animals by feeding them powder, granules or pellets with added vitamins, minerals or fatty oils and molasses is known. (Jap. Pat. Unexam. Publ. Nos. 56-144059 and 58-47442.) Furthermore, in order to balance sodium for herbivora which are fed high potassium content grass, highly compressed sodium chloride blocks can be licked (Jap. Pat. Unexam. Publ. No. 55-26814). These prior known breeding methods are not for relieving stress in animals.

Stress syndromes of animals are caused by three primary factors, namely nutrients, circumstances and psychological factors, for example lack of a sufficient number of feeding vessels, insufficient water supply, noise, sudden change of bed temperature in animal barns, insufficient ventilation, high humidity of beds, overcrowded breeding an lack of exercise. Among these, overcrowded breeading is a serious problem. For example, in the case of overcrowded breeding of pigs, discomfort syndromes such as tail biting and ear biting occur. (Disease of pig: Kindai Publ. Co., p. 745, 1983) In order to prevent these stresses and for avoiding dullness in pigs, iron chains or used tires are hung for the pigs to bite, or straw bedding is supplied in the pigsty for biting. An increase in the number of stress syndromes in pigs can coincide with a period of introducing new breeding administration systems and modern breeding methods, for example an expansion of the breeding scale, and automated centralized administration of the pigsty and the labor system are thought to affect the attitude and temper of pigs and may cause undesirable results. In the case of poultry, these conditions promote increased cannibalism (e.g. tail-pecking), and this cannibalism is a leading cause of death amoung poultry subject to these conditions. In the case of swine, cattle and poultry, these conditions decrease the animals' weight gain and increase the feed conversion ratio (feed intake/weight gain).

OBJECTS OF THE INVENTION

Accordingly, it is an object of the present invention to provide a method for preventing stress syndromes in animals.

Another object of the present invention is to provide a method of breeding for animals by supplying a feed substance that also prevents stress syndromes in animals, for example tail biting and ear biting among swine and cannibalism among poultry.

A further object of the present invention is to provide a breeding method characterized by improved growth promotion and higher feed conversion ratio.

Still another object of the present invention is to provide an edible material for achieving the above objects.

SUMMARY OF THE INVENTION

We have found that stress can effectively be avoided by making a pig, calf, or hen bite or lick a glucose block of a size and hardness such that it is not easily swallowed. Furthermore, we have found that the feed conversion ratio can be improved by stimulating salivation and the ingestive nerve centers. Moreover, essential components such as vitamins, minerals and feed components for animals, for example electrolytes for preventing dehydration in calves and physiological iron deficiency in piglets, can advantageously be added as ingredients of the sugar block.

A sugar block according to the present invention comprises glucose as its main component and has a shape and hardness which are not easily swallowed by animals and not easily crumbled.

Molding of the sugar block can be effected, for example, in the following three ways;

1. Glucose powder is press-molded. Stearic acid or magnesium stearate can preferably be added as a lubricant.
2. Glucose solution is allowed to solidify in a suitable vessel.
3. A previously molded solid glucose block is cut to suitable shape.

The reasons why glucose (over 50% w/w) is selected as the main component are that polysaccharides such as starch, dextrin, lactose or sucrose cannot directly be absorbed but are absorbed after digestion in vivo, are easily covered with mold (fungi) or are less sweet. Also sucrose has the disadvantage of abnormal fermentation in the intestine; while fructose and xylose are expensive.

The size, shape and hardness of the sugar block are preferably as follows:

(1) Weight: Over 50 g, preferably over 500 g, even over 25 kg according to the kind of animal. The amount in the case of piglets is preferably the amount piglets (approximately 10 piglets) can eat within 1-3 weeks.

(2) Shape: Length and width: over 2 cm. Spherical, cylindrical stick, rectangular stick, truncated cone, hemisphere, hollow shape such as doughnut and bowl-shaped. Hanging type is preferable to maintain sanitary conditions by avoiding touching the ground. Doughnut or stick type of sugar block is preferable. In case of doughnut type, its inner diameter should have a size which the animal's nose or beak can easily enter. A small diameter can be used for young animals and a larger diamter for grown animals. For licking the sugar block, a cylindrical stick rectangular prism or other shape is preferably selected. A protector such as plastic can be attached to the sugar block for controlling crumbling.

(3) Compression strength: Over 5 kg/cm$^2$, preferably 50–100 kg/cm$^2$.

(4) Water content: 0.1–20%, preferably 0.2–15%, by weight.

(5) pH: 3–7 when dissolved as 5–10% by weight sugar block solution.

(6) Ingredients: Glucose content is over 50%, preferably over 70% by weight and other ingredients can be added in order to improve the taste and the compressive strength of the block.

Sugars other than glucose, artificial sweeteners, seasonings, flavors, acidifiers such as citric acid, tartaric acid, malic acid or lactic acid, antibiotics such as bacitracin, penicillins, aminosugars, tetracyclines, macrolides, polysaccharides, polypeptides or polyethers, synthetic antimicrobial agents aush as olaquindox, carbadox or sulfonamides, hemostatics such as tranexamic acid, anthelmintics, live bacteria (prebiotics), enzymes, vitamins such as vitamins A, $D_2$, $D_3$, E, $K_1$, $K_2$, $B_1$, $B_2$, $B_6$, $B_{12}$, C, pantothenic acid, folic acid, biotin, nicotinic acid, cholin or inositol, amino acids such as glycine, methionine, tryptophan, lysine, alanine, isoleucine or threonine, salts or electrolytes such as magnesium sulfate, calcium carbonate, magnesium carbonate, potassium iodide, calcium phosphate, sodium chloride, sodium citrate, potassium chloride, manganese carbonate, zinc carbonate, copper sulfate, cobalt sulfate, sodium dihydrogen phosphate, potassium phosphate, sodium acetate, potassium acetate, calcium lactate, magnesium acetate, calcium gluconate or ferrous fumarate, coloring agents, antiseptics, antioxidants, and caking agents such as dextrin, gum arabic, sodium carboxy methyl cellulose or sodium polyacrylic acid can be added as desired.

The sugar block of the present invention is preferably supplied to the animals in the breeding house, specially animals at the fattening stage in the weaning period.

The following examples illustrate the present invention, but are not to be construed as limiting.

EXAMPLE 1

Preparation of sugar block

Magnesium stearate 1% by weight was mixed with purified glucose powder and pressed at 1000 kg/cm² in hydraulic pressure equipment to obtain a doughnut-shaped sugar block, weight 500 g, outer diamter 13 cm×inner diameter 7.5 cm×width 4 cm.

Water content: 9.2%. Compressive strength: 80 kg/cm².

EXAMPLE 2

Preparation of sugar block

Dextrin 5%, DL-tryptophan 0.05%, dry copper sulfate 0.05%, ferrous fumarate 0.3% and magnesium stearate 1.0%, all by weight, were mixed with anhydrous glucose powder, and pressed at 1000 kg/cm² by hydraulic pressure equipment to obtain a sugar block, weight 1 kg, rectangular prism 27.5 cm long×7 cm wide×4 cm high.

Water content: 0.19%. Compressive strength: 70 kg/cm².

EXAMPLE 3

Preparation of sugar block

Sodium chloride 10%, ferrous fumarate 0.2%, dry copper sulfate 0.04%, cobalt sulfate 0.04%, potassium iodate 0.01%, manganese carbonate 0.04%, zinc carbonate 0.02%, powdered starch hydrolyzate (glucose content 8%) 40% and magnesium stearate 1%, all by weight, were mixed with purified glucose and pressed at 1400 kg/cm² in a hydraulic press to obtain a sugar block, weight 5000 g, rectangular prism 20 cm long×15 cm wide×13 cm high.

EXAMPLE 4

Preparation of sugar block

Starch enzymatic hydrolyzate glucose solution was concentrated in vacuo to prepare a Brix (20° C.) 85 glucose solution. Purified glucose powder was added at 3% w/w thereto. The mixture was poured into a cylindrical vessel, diameter 4 cm, length 30 cm, and allowed to stand one day and one night at room temperature to harden, then the vessel was removed.

Sugar block, cylindrical, weight 500 g was obtained.

Water content: 10.5%. Compressive strength: 90 kg/cm².

Brix-value, water content and compressive strength obtained by the said crystallization procedure are shown in Table 1.

TABLE 1

| Brix (20° C.) | After Allowing to Stand One Day and One Night | |
|---|---|---|
| | Water Content (%) | Compression Strength (kg/cm²) |
| 77.3 | 21.3 | — |
| 79.9 | 18.3 | 5.2 |
| 80.0 | 17.5 | 6.6 |
| 82.0 | 14.9 | 25 |
| 83.5 | 12.9 | 40 |
| 85.9 | 10.3 | 90 |
| unmeasurable | 7.9 | 140 |

EXAMPLE 5

Preparation of sugar block

Starch hydrolyzate glucose solution was concentrated in vacuo to obtain a Brix (20° C.) 85 glucose solution.

Vitamin A 500,000 u/g powder 0.8 g, vitamin $D_3$ powder 0.16 g, vitamin E 50% powder 2.0 g, vitamin C calcium 2.0 g, vitamin $B_{12}$ 50-fold dilution powder 0.05 g, ferrous fumarate 3.2 g, dry copper sulfate 0.5 g, calcium iodate 0.1 g, anhydrous citric acid 5 g, sodium chloride 10 g, sodium propionate 1 g, milk flavor in an effective quantity and purified glucose powder 30 g were mixed at 70°–80° C. with 1 kg of the said glucose solution to obtain a mixed solution. 500 g of said mixed solution was poured into a doughnut-shaped plastic vessel, outer diameter 13 cm, inner diameter 7.5 cm, depth 5 cm, and allowed to stand one day and one night at room temperature to harden.

The plastic vessel was removed to obtain a doughnut type sugar block.

Water content: 10.0%. Compressive strength: 80 kg/cm².

EXAMPLE 6

Preparation of sugar block

Purified glucose powder was heated at 120° C. to prepare liquid glucose. To glucose liquid 1 kg were added at 70°–80° C., kitasamycin base 5 g (potency), carbadox 3 g, skim milk 10 g, sodium propionate 1 g and purified glucose powder 30 g. The mixture was poured into a rectangular prism-shaped plastic vessel, 30 cm long, 7 cm wide, 5 cm deep and allowed to stand for one day and one night to harden. The plastic vessel was removed to obtain a stick-type sugar block.

Water content: 9.0%. Compressive strength: 120 kg/cm$^2$.

EXAMPLE 7

Preparation of sugar block

Dextrin 5% and magnesium stearate 1% were mixed with purified glucose powder, and introduced into a mortar vessel, 27.5 cm long, 7 cm wide. The mixture was pressed with a hydraulic press to prepare various shapes to sugar blocks. In Table 2, the relationship of the width of the block and compressive strength, tested on piglets, is set forth. The water content was 9.5%.

TABLE 2

| Compressive Strength (kg/cm$^2$) | Size 27.5 cm × 7 cm × x cm | | | |
|---|---|---|---|---|
| | x = 1 cm | 2 cm | 4 cm | 6 cm |
| 5 | − | − | − | ± |
| 50 | − | + | + | + |
| 100 | − | + | + | + |
| 150 | − | + | + | ++ |
| 180 | − | +++ | +++ | +++ |

In the Table:
−: easily crumbled
±: entirely consumed within 1 week
+: entirely consumed within 1–3 weeks
++: partially consumed within 3 weeks
+++: not eaten in over 3 weeks

Field test using sugar block

Test for improvement on body weight increase and effective food conversion ratio in pigs.

Sugar blocks prepared in Example 1 were used.

Piglets, 6.5 kg weight at the weaning period, were bred for 4 weeks and observed as to body weight increase and effective feed conversion ratio.

A sugar block supplied group and a sugar block unsupplied group (control) were set up. The tested groups and the observations are shown in Table 3. The tests were performed three times. Commercially available feed was used during each test period. Water was freely supplied. The results are shown in Table 4. The body weight increase measured twice in the test period 0–2 weeks and 2–4 weeks, and three times in the test period −4 weeks (the entire period) are shown to be significantly different from the controls at P<0.05. Improvement in the effective feed conversion ratio was observed. In the control group, much struggling of the individuals was observed and many incompletely grown piglets were found. In the sugar block supplied group, no or less struggling was observed and each individual grew steadily.

TABLE 3

| | | | Frequency of Observation | | |
|---|---|---|---|---|---|
| Test Group | No. of Animals | No. of Sugar Blocks Supplied | Body Weight | Amount of Feed Consumption | General Observation |
| Sugar block supply | 10 | One block at any time, replaced when consumed. | Week 0 (starting test). Week 2, week 4 (at the end of test) | Week 2 and 4 (at the end of test) | Observed every day |
| Control | 10 | — | Same as above | Same as above | Same as above |

Note:
All tests were performed three times.

Effectiveness of prevention of stress in pigs

Piglets, 30 kg in weight, in the sugar block supplied group (15 piglets) and sugar block unsupplied group (control, 15 piglets), were bred under overcrowded breeding conditions in a 5 m$^2$ area. General symptoms were observed for two weeks. In the control group, on the 7th day after the start of the test, many struggling piglets were observed, and on the 9th day many piglets bleeding from the tail and ears, from bites, were found.

On the contrary, in the sugar block supplied group, less struggling was observed, and no tail bites were found during the test period (refer to Table 5).

TABLE 4

| Test times | Test group | Body weight (Kg) | | | Body weight increased (Kg) | | | Amount of feed intake (Kg) | | | feed conversion ratio | | |
|---|---|---|---|---|---|---|---|---|---|---|---|---|---|
| | | 0 week | 2 week | 4 week | 0~2** | 2~4** | 0~4** | 0~2** | 2~4** | 0~4** | 0~2** | 2~4** | 0~4** |
| 1st | Sugar block supply group | 6.82 ± 1.14 | 12.11 ± 2.15 | 18.89 ± 3.34 | 5.29 ± 1.12 | 6.78 ± 1.34* | 12.07 ± 2.30* | 8.09 | 13.36 | 21.45 | 1.53 | 1.97 | 1.78 |
| | Control group (unsupplied) | 6.99 ± 0.92 | 11.15 ± 2.23 | 16.47 ± 3.65 | 4.16 ± 1.36 | 5.32 ± 1.54 | 9.48 ± 2.77 | 6.82 | 10.96 | 17.78 | 1.64 | 2.06 | 1.88 |
| 2nd | Sugar block supply group | 6.49 ± 0.89 | 11.23 ± 2.02 | 17.71 ± 3.25 | 4.74 ± 1.19* | 6.48 ± 1.31 | 11.22 ± 2.44* | 6.86 | 11.63 | 18.49 | 1.46 | 1.90 | 1.71 |
| | Control | 6.65 ± 0.84 | 9.89 ± 2.08 | 15.04 ± 3.72 | 3.24 ± 1.34 | 5.15 ± 1.72 | 8.39 ± 2.94 | 5.02 | 10.35 | 15.37 | 1.55 | 2.01 | 1.83 |
| 3rd | Sugar block supply group | 6.22 ± 1.08 | 10.67 ± 2.14 | 17.27 ± 3.29 | 4.45 ± 1.26* | 6.60 ± 1.27* | 11.05 ± 2.45* | 6.59 | 12.14 | 18.73 | 1.48 | 1.84 | 1.70 |
| | Control | 6.21 ± 1.07 | 9.37 ± 2.14 | 14.20 ± 3.59 | 3.06 ± 1.21 | 4.83 ± 1.56 | 7.99 ± 2.64 | 4.93 | 9.61 | 14.53 | 1.56 | 1.99 | 1.82 |

**week
*Significantly different from control: $P < 0.05$

TABLE 5

| Test group | Number of Animals | Number of tail bites[1] After starting the test | | | | | |
|---|---|---|---|---|---|---|---|
| | | 9th day | 10th day | 11th day | 12th day | 13th day | 14th day |
| Sugar block supplied group | 15 | 0/15[2] | 0/15 | 0/15 | 0/15 | 0/15 | 0/15 |
| Unsupplied group (control) | 15 | 2/15 | 2/15 | 4/15 | 5/15 | 5/15 | 6/15 |

[1] Individuals showing bleeding from the tail are designated as tail bites

[2] $\frac{\text{Number of animals with tail bites}}{\text{Numbers of animals tested}}$ It will therefore be seen that supplying sugar blocks of the present invention produces a relaxation of stress in pigs.

Further test for improvement in body weight increase and effective feed conversion ratio in pigs:

Study period, May 29, 1985–July 1, 1985 (33 days).

32 weaned piglets produced by four sows and having an average age of 31 days, were used. The animals were divided into two groups of 16 piglets each, a test group provided with the sugar block according to the present invention, and a control group. The test group was supplied with two sugar blocks suspended in the pen throughout the observation period. Both groups were fed prestarter feed for piglets from the start of the experiment until day 12, and starter feed thereafter until day 33. Body weight was measured on days 0, 12 and 33. Weight gain and cumulative feed intake were measured on days 12 and 33. Clinical observations were taken daily.

The test group showed increased weight gain and decreased feed conversion ratio, during both periods of day 0–12 and day 12–33, as compared with the control group (see Table 6). Feed intake increased in the test group, the subjects of which had a lower incidence of diarrhea and fought less than those of the control group. Most animals in the test group had improved coat glossiness and florid skin.

TABLE 6

| | Test Group | Control Group |
|---|---|---|
| Weight Gain (kg) | 12.78 ± 1.74 | 10.93 ± 2.08 |
| Weight Gain Index | 117 | 100 (by definition) |
| Feed Intake (formula, kg) | 355.29 (22.21/head) | 328.15 (20.51/head) |
| Sugar Block Intake | 1.4 | — |
| Feed Conversion Ratio | 1.74 | 1.88 |

The weight gain of the test group is shown to be significantly different from the control group at $P<0.01$.

These results demonstrate that weight gain and feed conversion ratio, as well as general health status, is significantly improved among the weaned piglets of the test group.

Test for improvement in body weight increase and effective feed conversion ratio in cattle:

Study period, June 24, 1985–Aug. 8, 1985 (45 days).

There were used eight male Holstin calves having an average weight of 55 kg each. The animals were divided into two groups of four calves each, a test group provided with the sugar block according to the present invention, and a control group. Each member of the test group had a said sugar block fixed to its feeding trough throughout the study period. Both groups were fed a diet of milk substitute and milk replacer in pellet form during the 45 days of the experiment.

The result of this test are shown in Table 7:

TABLE 7

| Parameter of Interest | Test Group | Control Group |
|---|---|---|
| Weight Gain (kg) | 40.8 ± 2.18 | 34.1 ± 4.16 |
| Weight Gain Index | 120 | 100 (by definition) |
| Mean Feed Intake (formula, kg) | 69.5 | 63.9 |
| Sugar Block Intake | 1.0 | — |
| Feed Conversion Ratio | 1.73 | 1.88 |

These results show that the test group displayed increased weight gain and feed intake, and decreased feed conversion ratio (feed intake/weight gain), relative to the control group.

Test for prevention of cannibalism in poultry:

Study period, Mar. 17, 1986–Apr. 25, 1986 (40 days).

There were used 1000 Shaver Star Cross hens having an average age of 16 weeks. The animals were divided into two groups of 500 hens each, a test group provided with the sugar block of the present invention, and a control group. The hens of each group were placed in 50 cages, ten hens per cage. A sugar block according to the present invention and measuring $7\times7\times3$ cm, was suspended in the center of each of the 50 cages of the test group. Each day of the study period, the number of incidents of cannibalism was recorded.

The results of this test are shown in Table 8:

TABLE 8

| | Test Group | Control Group |
|---|---|---|
| Incidents of cannibalism (total number, usually in the form of tail pecking) | 55 | 565 |
| Number of deaths | 8 | 32 |

The test group shows fewer incidents of cannibalism, and fewer deaths, due primarily to the decreased cannibalism.

What is claimed is:

1. A method of enhancing the growth and weight gain of swine during the fattening thereof, comprising supplying to said swine, during said fattening, as a supplemental foodstuff to be licked, a sugar block containing at least 70% by weight of glucose and having a hardness such that said block does not easily crumble, said block having a compressive strength in the range of 50 to 150 kg/cm$^2$ and a water content of 0.2 to 15% by weight, said block having a weight of at least 500 g, each dimension of said block being greater than 2 cm, and said block being suspended at a height above ground level accessible to licking by said swine, said block being formed in the shape of a doughnut having a hole of a size sufficient to accommodate the nose of one of said swine, whereby growth of said swine and the feed conversion ratio of feed provided to said swine during said fattening are both enhanced.

2. A method as claimed in claim 1, in which said fattening occurs during the weaning period.

* * * * *